Patented Jan. 13, 1953

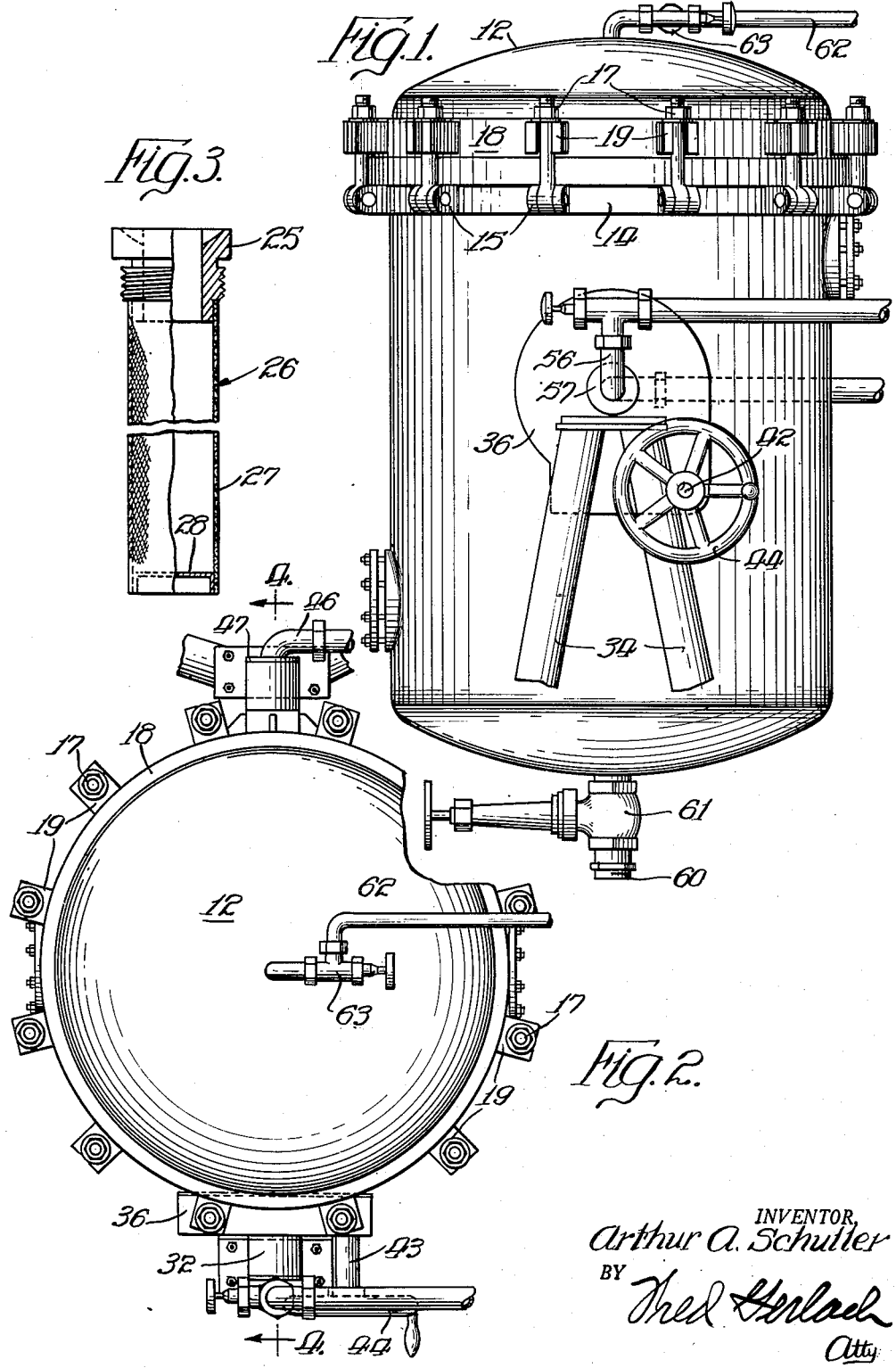
Jan. 13, 1953 — A. A. SCHULLER — 2,625,273
INVERTIBLE FILTER UNIT
Filed Dec. 2, 1949 — 2 SHEETS—SHEET 1
INVENTOR.
Arthur A. Schuller
BY Fred Gerlach
Atty

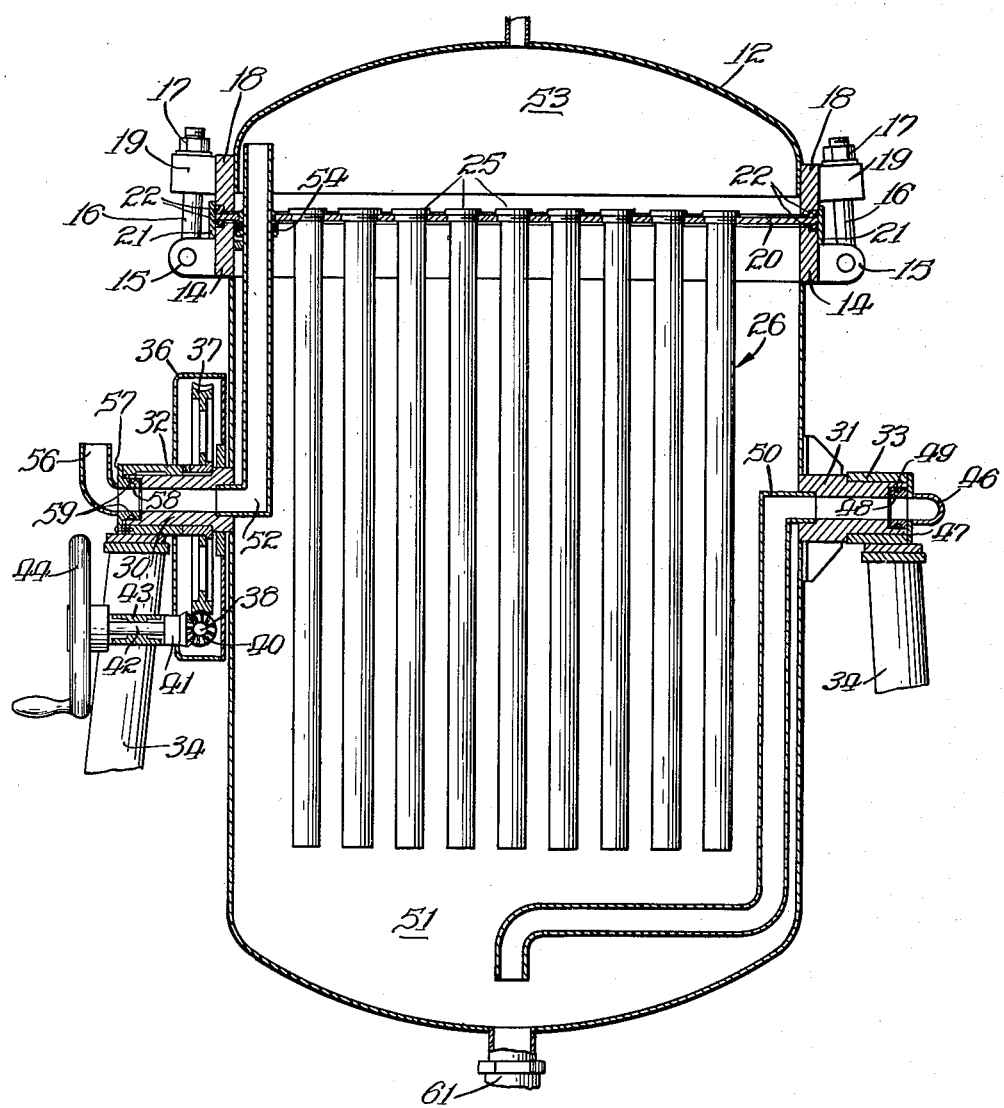

2,625,273

UNITED STATES PATENT OFFICE 2,625,273

INVERTIBLE FILTER UNIT

Arthur A. Schuller, Chicago, Ill.

Application December 2, 1949, Serial No. 130,655

3 Claims. (Cl. 210—184)

This invention relates to invertible filters of the type that is disclosed in my co-pending United States patent application, Serial No. 34,363, filed on June 22, 1948.

One of the primary objects of this invention is to provide a filter which is an improvement upon, and has certain inherent advantages over, previous filters, including that of my aforementioned application, and is characterized by a novel arrangement of parts, simplicity of design and high efficiency.

Another object is to provide a filter in which the mounting of the usual filter-unit supporting plate is simplified and improved, thus contributing to quick and easy removal of the filter units from the filter tank.

Additional objects and advantages will be pointed out in conjunction with the ensuing detailed description.

In the drawings which accompany this specification:

Fig. 1 is a side elevation of an invertible filter embodying the invention;

Fig. 2 is a fragmentary plan view;

Fig. 3 is a detail of one of the filter units; and

Fig. 4 is a vertical section taken on the line 4—4 of Fig. 2.

The illustrated filter constitutes the preferred form or embodiment of the invention and includes a cylindrical tank 10 and a dome-shaped cover 12, both of which are made of stainless steel plate. A steel ring 14 is welded to the upper end of the tank side wall and has an annular series of radially projecting lugs 15 which are spaced equidistantly apart and to which are pivotally anchored a plurality of clamping bolts 16 with nuts 17. Similarly welded to the depending skirt of the cover 12 is a steel ring 18 having a plurality of radially projecting lugs 19 corresponding numerically with the lugs 15 and aligned therewith. Each lug 19 is slotted in order to receive one of the bolts 16. When the clamping bolts 16 are in upright posture, as shown, and the nuts 17 are tightened, the cover 12 is held firmly in place with respect to the tank. When the nuts 17 are loosened the clamp bolts may be swung outwards and downwards into a released position wherein the cover is free and hence may be removed from the tank.

A circular steel plate 20, referred to herein as the filter-unit supporting plate, is centered with respect to the upper end of the tank side wall and the skirt of the cover by means of an annular steel band 21 and is gripped between a pair of annular gasket 22 which are seated in annular grooves in the rings 14 and 18 respectively. The lower portion of the band 21 is suitably connected to the upper portion of the ring 14. The supporting plate 20 has numerous circular openings 24, each of which is threaded to receive a tubular metal bushing 25 constituting a component part of a filter unit 26 (see Fig. 3) which also includes a long tubular screen 27, the latter being attached at its upper end to the bushing 25 and closed at its lower end by an inverted cup-shaped sheet metal plug 28.

Two oppositely projecting diametrically opposite tubular trunnions 30 and 31 are fixedly secured to the central portion of the side wall of the tank 10 and are journaled respectively in pillow blocks 32, 33. The latter are mounted on, and supported by, suitable standards 34, the lower ends of which are anchored to the floor or other solid foundation, or to a truck in case it is desired that the filter as a whole be portable.

A sheet metal housing 35 is fixedly secured to the pillow block 32 and encloses a worm wheel 37 which is keyed to the trunnion 30 and serves as a medium for rotating the filter about its trunnions. A worm, not shown, is keyed to a shaft 38 to which also is keyed a miter gear 40. The latter, in turn, is meshed with a similar miter gear 41 which is keyed to a shaft 42 that is journaled in a bearing 43 and is provided at its outer end with a handwheel 44 for turning purposes. As will be evident, rotation of the handwheel 44 effects rotation of the filter.

The operating position of the filter is that depicted in Figs. 1 and 4. Unfiltered liquid, in which may be suspended an appropriate filter aid, is admitted to the lower end of the filter tank through the bore of the trunnion 31, the outer end of which is connected to a supply conduit 46. The latter has welded to it a flange 47 having a circular boss 48 extending into a counterbore in the outer end of the trunnion 31. The boss is annularly grooved externally to accommodate a sealing ring 49. The flange 47 is bolted or otherwise detachably secured to the outer end of the pillow block 33. A pipe-type conduit 50 which is located interiorly of the lower filter chamber 51 beneath the supporting plate 20 is welded or otherwise fixedly connected to the inner end of the bore of the trunnion 31 and extends downwardly and then to the vertical axis of chamber 51, near the bottom thereof, where its discharge end is directed downwardly so that the unfiltered liquid emerging therefrom is not projected directly against the filter units.

A pipe-type conduit 52, located interiorly of the filter, is connected, as by welding, to the inner end of the trunnion 30 and is in direct communication with the bore thereof. It extends upwardly through a hole in the filter-unit supporting plate 20 into the chamber 53 above said supporting plate. To forestall leakage of unfiltered liquid from the lower chamber 51 into the upper chamber 53, the supporting plate 20 is equipped with a ring seal 54 which embraces the conduit 52, the arrangement enabling quick removal and replacement of the supporting plate 20, together with the several filter units 26, without disturbing the conduit 52.

A discharge conduit 56 is attached, as by welding, to a flange 57 having a circular boss 58. The latter extends into a counterbore in the outer end of the trunnion 30 and is annularly grooved externally to accommodate a sealing ring 59. The flange 57 is bolted or otherwise detachably secured to the outer end of the pillow block 32.

The unfiltered liquid entering through the conduit 46 passes via the bore of the trunnion 31 into the conduit 50 by which it is conducted to the bottom of the chamber 51. When the chamber 51 is full the fluid pressure therein causes the liquid to pass through the numerous meshes of the several tubular screens 27, whence it flows upwardly through the bores of the filter units 26 into the upper chamber 53, thence passing into the conduit 52 by which it is conducted to the discharge conduit 56 by way of the bore in the trunnion 30. A drain fitting 60, including a shut-off valve 61, is connected to the bottom of the tank; and a pipe 62, including a shut-off valve 63, is connected with the chamber 53 through the cover 12.

When a run has started after the filter has been cleaned, the liquid to be filtered is loaded with filter aid and re-circulated until the filter unit screens are sufficiently coated with the filter aid so that the filtrate is clear, the re-circulation being thereupon discontinued and the clear filtrate directed elsewhere.

The pipe 62 serves three purposes: in the first place, it functions as a vent to facilitate discharge of air from the filter while the tank is being filled; secondly, it functions as a conduit for the filtrate initially conveyed back to the usual slurry tank for recirculation; and, thirdly, it functions as a conduit through which the chamber 53 may be drained when the filter is inverted.

If at the end of a run it is desirable at once to filter and retrieve the liquid remaining in the tank, either because another run of the same kind of liquid is not to begin immediately or because some different liquid is to be filtered, the tank is inverted by rotating it 180° on its trunnions, and compressed air, steam or gas is introduced through the conduit 46 to force the residue of liquid through the filter units into the chamber 53 and thence to the discharge conduit 56 by way of the conduit 52. The little thereafter remaining in chamber 53 may be drained off the pipe 62. The filter may then be returned to its normal or original posture and flushed out by introducing water or cleaning solvent into the chamber 53 by way of the discharge conduit 56, whence it flows under pressure through the several filter units into the chamber 51 and then out through the valve 61. The coatings of filter aid adhering to the screen tubes 27 are broken off by the outwardly directed water pressure within the filter units and the resultant detritus is withdrawn through the drain pipe 60 and the valve 61. When thus cleaned the filter is ready to be put back into operation.

One of the features to which the appended claims are directed resides in the novel arrangement for interconnecting the chamber 53 with the bore of the trunnion 30. Such arrangement embraces the conduit 52 which extends slidably through the seal 54 into the chamber 53 and is connected at its normal lower end to the bore of trunnion 30. The conduit 52, located inside the filter tank, supersedes the prior arrangement which involved unsightly piping attached to the outside of the filter and connected to the upper chamber through the cover. With the prior arrangement it was necessary to uncouple the pipe connection before removing the cover and then re-couple it after replacing the cover. The new arrangement is considerably more satisfactory from the standpoint of sanitation—the direct connection afforded by the conduit 52 being less prone to formation of pockets and crevices in which filtrate residues may collect and remain notwithstanding the washing operation, thus possibly contaminating subsequent runs of filtrate.

Another feature resides in the provision of the conduit 50, also interiorly of the filter, by means of which the incoming liquid is conducted to the bottom of the tank and expelled downwardly. Like the first-mentioned feature, this also eliminates exterior piping and obviously effects a similar improvement from the standpoint of sanitation.

A third feature of the invention has to do with the novel manner in which the filter-unit supporting plate 20 is gripped between the two annular gaskets 22 by the complementary rings 14 and 18 and the clamping bolts 16. This arrangement firmly anchors the filter-unit supporting plate against the fluid pressure acting thereon while at the same time enabling the said plate and attached filter units to be quickly withdrawn following removal of the cover.

While I have illustrated and described but one embodiment of my invention, it will be self-evident to those who are skilled in the art that various modifications may be made within the scope and purview of my inventive concept, and that the invention should not be construed as limited otherwise than as plainly indicated by the terms of the appended claims.

Having described my invention, what I claim as new and desire to secure by Letters Patent is:

1. A pressure type filter comprising in combination a supporting structure provided with a pair of horizontally aligned and spaced apart pillow blocks, a tank disposed between the pillow blocks and consisting of a continuous side wall, a bottom wall at one end of the side wall and a removable dome shaped cover at the other end of said side wall, a unitary filter unit disposed within the tank, embodying a horizontal supporting plate extending across the upper end of the tank side wall, provided with a vertical seal-equipped hole therein and dividing the tank interior into a lower compartment between it and the bottom wall and an upper compartment between it and the cover, also embodying a plurality of spaced apart porous filter elements connected to, and depending from, the supporting plate and serving to establish communication between the compartments, and having its supporting plate so mounted that the unit as a whole may be bodily removed from the tank by lifting it upwards after removal of the cover, a pair of horizontal tubular trunnions connected fixedly to, and projecting outwards from, diametrically opposite portions of the tank side wall at points between the supporting plate and the tank bottom wall and mounted in said pillow blocks so that they support the tank so that it is capable of being tilted back and forth between a normal position wherein the bottom wall is at the bottom and an inverted position wherein the bottom wall is at the top, a supply conduit connected to, and communicating with, the outer end of one of the trunnions, a discharge conduit connected to, and communicating with, the outer end of the other trunnion, a first pipe having one end thereof connected to, and communicating with, the inner end of the one trunnion and its other end in communication with the lower compartment, and adapted when the tank is in its normal position to deliver liquid to be filtered from the supply conduit to the lower compartment for up-flow through the filter elements into the upper compartment, and an L-shaped second pipe disposed within the tank, adapted when the tank is in its normal position to conduct filtered liquid from said upper compartment to said other trunnion for discharge via the discharge conduit, and consisting of a horizontal branch having one end thereof connected fixedly to the inner end of said other trunnion and a straight vertically extending second branch having the lower end thereof connected to the other end of the first mentioned branch and its upper end extending slidably through said hole in the supporting plate in order that the unit as a whole may be removed without disturbing said second pipe.

2. A pressure type filter comprising in combination a supporting structure provided with a pair of horizontally aligned and spaced apart pillow blocks, a tank disposed between the pillow blocks and consisting of a continuous side wall, a bottom wall at one end of the side wall and a removable dome shaped cover at the other end of said side wall, a unitary filter unit disposed within the tank, embodying a supporting plate extending across the upper end of the tank side wall, provided with a vertical hole therein and dividing the tank interior into a lower compartment between it and the bottom wall and an upper compartment between it and the cover, also embodying a plurality of spaced apart porous filter elements connected to, and normally depending from, the supporting plate and serving to establish communication between the compartments, and having its supporting plate so mounted that the unit as a whole may be bodily removed from the tank by lifting it upwards after removal of the cover, a pair of horizontal tubular trunnions connected fixedly to, and projecting outwards from, diametrically opposite portions of the tank side wall at points between the supporting plate and the tank bottom wall and mounted in said pillow blocks so that they support the tank so that it is capable of being tilted back and forth between a normal position wherein the bottom wall is at the bottom and an inverted position wherein the bottom wall is at the top, a supply conduit connected to, and communicating with, the outer end of one of the trunnions, a discharge conduit connected to, and communicating with the outer end of the other trunnion, a first pipe disposed wholly within the lower compartment, having one end thereof connected fixedly to, and communicating with, the inner end of the one trunnion and its other end terminating a small distance above, and facing in the direction of, the central portion of the bottom wall of the tank, and adapted when the tank is in its normal position to deliver liquid to be filtered from the supply conduit to the lower compartment for up-flow through the filter elements into the upper compartment, and an L-shaped second pipe disposed within the tank, adapted when the tank is in its normal position to conduct filtered liquid from said upper compartment to said other trunnion for discharge via the discharge conduit, and consisting of a horizontal branch having one end thereof connected fixedly to the inner end of said other trunnion and a straight vertically extending second branch having the lower end thereof connected to the other end of the first mentioned branch and its upper end extending slidably through said hole in the supporting plate in order that the unit as a whole may be removed without disturbing said second pipe.

3. A pressure type filter comprising in combination a supporting structure provided with a pair of horizontally aligned and spaced apart pillow blocks, a tank disposed between the pillow blocks and consisting of a continuous side wall, a bottom wall at one end of the side wall and a removable dome shaped cover at the other end of said side wall, a unitary filter unit disposed within the tank, embodying a supporting plate extending across the upper end of the tank side wall, provided with a vertical hole therein and dividing the tank interior into a lower compartment between it and the bottom wall and an upper compartment between it and the cover, also embodying a plurality of spaced apart porous filter elements connected to, and normally depending from, the supporting plate and serving to establish communication between the compartments, and having its supporting plate so mounted that the unit as a whole may be bodily removed from the tank by lifting it upwards after removal of the cover, a pair of horizontal tubular trunnions connected fixedly to, and projecting outwards from, diametrically opposite portions of the tank side wall at points between the supporting plate and the tank bottom wall and mounted in said pillow blocks so that they support the tank so that it is capable of being tilted back and forth between a normal position wherein the bottom wall is at the bottom and an inverted position wherein the bottom wall is at the top, a supply conduit connected to, and communicating with, the outer end of one of the trunnions, a discharge conduit connected to, and communicating with, the outer end of the other trunnion, a first pipe disposed wholly within the lower compartment, having one end thereof connected fixedly to, and communicating with, the inner end of the one trunnion and its other end terminating a small distance above, and facing in the direction of, the central portion of the bottom wall of the tank, and adapted when the tank is in its normal position to deliver liquid to be filtered from the supply conduit to the lower compartment for up-flow through the filter elements into the upper compartment, an L-shaped second pipe disposed within the tank, adapted when the tank is in its normal position to conduct filtered liquid from said upper compartment to said other trunnion for discharge via the discharge conduit, and consisting of a horizontal branch having one end thereof connected fixedly to the inner end of said other trunnion and a straight vertically extending second branch having the lower end thereof connected to the other end of the first mentioned branch and its upper end extending slidably through said hole in the supporting plate in order that the unit as a whole may be removed without disturbing said second pipe, and a valve equipped pipe disposed exteriorly of the tank and having one end thereof connected to the cover and communicating with the upper compartment.

ARTHUR A. SCHULLER.

REFERENCES CITED

The following references are of record in the file of this patent:

UNITED STATES PATENTS

| Number | Name | Date |
|---|---|---|
| Re. 14,214 | Akins | Nov. 14, 1916 |
| 273,543 | Hyatt | Mar. 6, 1883 |
| 279,226 | Crocker | June 12, 1883 |
| 517,240 | Roger | Mar. 27, 1894 |
| 1,120,629 | Salisbury | Dec. 8, 1914 |
| 1,213,866 | Harding, Jr. | Jan. 30, 1917 |
| 1,799,481 | Sanger et al. | Apr. 7, 1931 |
| 1,800,605 | Crowley | Apr. 14, 1931 |
| 1,823,813 | Wurster | Sept. 15, 1931 |
| 2,496,370 | Baily | Feb. 7, 1950 |